Sept. 30, 1969  S. D. POOL ET AL  3,469,773
FAN FOR COMBINE
Filed July 12, 1968

INVENTORS
STUART D. POOL
CHARLES V. EVERETT
HOMER N. GRILLOT
BY ATT'Y.

United States Patent Office 3,469,773
Patented Sept. 30, 1969

3,469,773
FAN FOR COMBINE
Stuart D. Pool, Naperville, Charles V. Everett, Warrenville, and Homer N. Grillot, Naperville, Ill., assignors to International Harvester Company, Chicago, Ill., a corporation of Delaware
Filed July 12, 1968, Ser. No. 746,703
Int. Cl. F04d 17/08, 29/42; A01f 12/48
U.S. Cl. 230—125                           7 Claims

ABSTRACT OF THE DISCLOSURE

A fan for use with the cleaning system of a combine having a casing with air impervious end sections and an air pervious transverse section arranged so that the fan will draw air into the casing across its entire width and discharge a wide uniform stream of air to the cleaning system.

Background of the invention

The present invention relates generally to improvements in the fan for cleaning systems on combine harvesters and the like and more particularly to a new and improved fan that draws air in across its entire transverse width and discharges such air as a stream relatively uniform throughout such transverse width.

In conventional combine harvesters it is customary to provide a fan at the bottom of the harvester to produce a stream of air flowing through the harvester cleaning system. The conventional fan has an involute section in which is located a rotary fan and a nozzle section through which the air stream is discharged. It is required for the combine cleaning system that the air stream be discharged in a wide stream transversely across the entire harvester body. In conventional combines the air is drawn into the fan casing through openings formed in the end sections and it has been an inherent characteristic of these fans that there is a greater air flow adjacent the end sections than at points midway between the end sections. Although this has been recognized as an undesirable characteristic of such fans, because of the relatively narrow width of the harvesting machines, it has been tolerable. The trend, however, has been to produce combines of greater capacity and in doing so machines have become wider and wider and are now approaching the point where conventional end feed fans are no longer adequate. Reference may be had to the patent to Welty No. 2,351,567 of June 13, 1944 for a disclosure of a conventional fan of the type discussed above. This problem could, for course, be diminished if the diameter of the fans could be increased such that the ratio between the diamter and the width remains constant as the capacity of the combine is increased. This solution, however, is not practical in the design of combines because the maximum overall height of the machine is dictated by considerations such as the clearance under viaducts, bridges and barn doors. Another reason why the diameter of the fan casing cannot be increased is that the fan casing is the lowest protrusion beneath the combine body and it thus defines the ground clearance. It is necessary for proper maneuverability of the combine to maintain adequate ground clearance. Because the overall height, and the ground clearance of combines have reached their practical limits, the width of the combine is now being increased in the larger capacity machine.

Blower devices commonly known as transverse-flow blowers have a blower wheel which includes a plurality of elongated blades arranged in a cylindrical pattern such that the blower wheel has a hollow interior. The blower wheel is mounted in a housing and draws air into the housing through the elongated blades and into the hollow interior where there is produced a vortex rotating in the same direction as the blower wheel. Air escaping the vortex at increased velocity passes through the elongated blades and is discharged through a discharge area of the housing. Blower devices such as this are used, for example, in business machines, room aid conditioners and baseboard convectors and have the advantage that they can produce a wide stream of air and yet occupy a relative small amount of space. The stream of air produced by transverse-flow blowers is relatively thin and since a combine cleaning system requires a relatively thick stream of air, the use of transverse-flow blowers in combine cleaning systems is not a natural adaptation. However, transverse-flow blowers are appealing for this purpose because they conserve space and produce a wide uniform stream of air.

Summary of the invention

The general purpose of the invention is to provide a fan for the cleaning system of a combine harvester which embraces all the advantages of transverse-flow blowers and similarly employed fans and possesses none of the aforedescribed disadvantages. To attain this, the present invention contemplates a unique enclosed fan casing having end sections that are impervious to air, a transverse involute section, and a transverse inlet opening extending across the entire width of the fan casing. Applicants' invention provides an equal amount of air across the entire width of the fan and has thus permitted the width of the combine to be increased.

An object of the invention is to increase the capacity of a combine by increasing its width and to provide a fan for such a combine that will supply a uniform stream of air across the entire width of the combine cleaning system.

Description of the preferred embodiment

Figure 1:
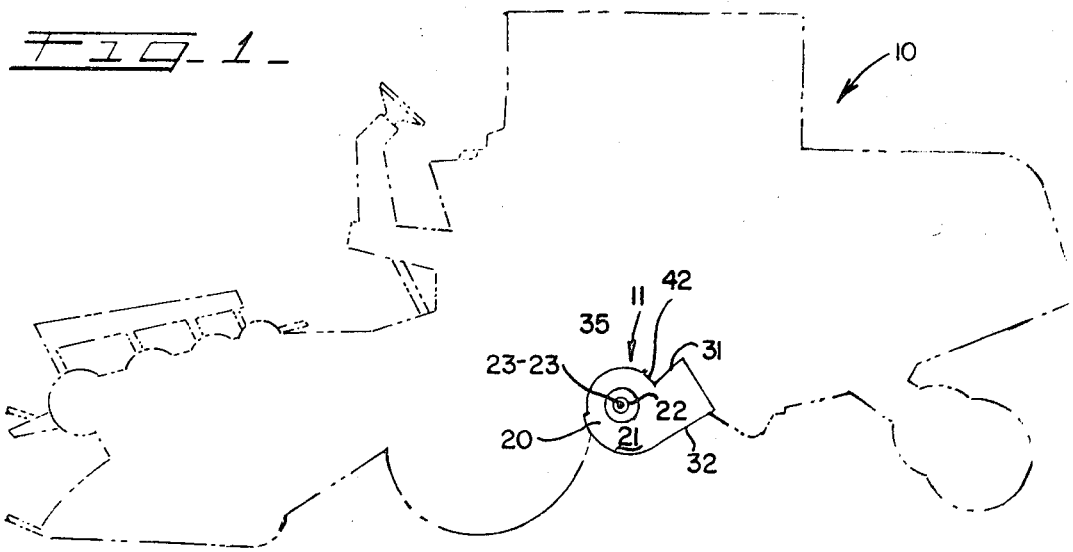
FIGURE 1 shows a side view silhouette of a combine having the cleaning system fan shown in full lines.

Referring now to the drawings wherein like reference characters designate like or corresponding parts throughout the several views, there is shown in FIGURE 1, a silhouette of a combine designated 10 which is shown in broken lines. The cleaning system fan 11 shown in full lines in FIGURE 1 extends transversely across the bottom of the combine. The cleaning system fan 11 comprises an enclosed casing 20 having end sections 21 made of a material such as sheet metal that is impervious to the passage of air. A bearing 22 is supported on each of the end sections 21 and define a fan axis 23—23.

Figure 2:
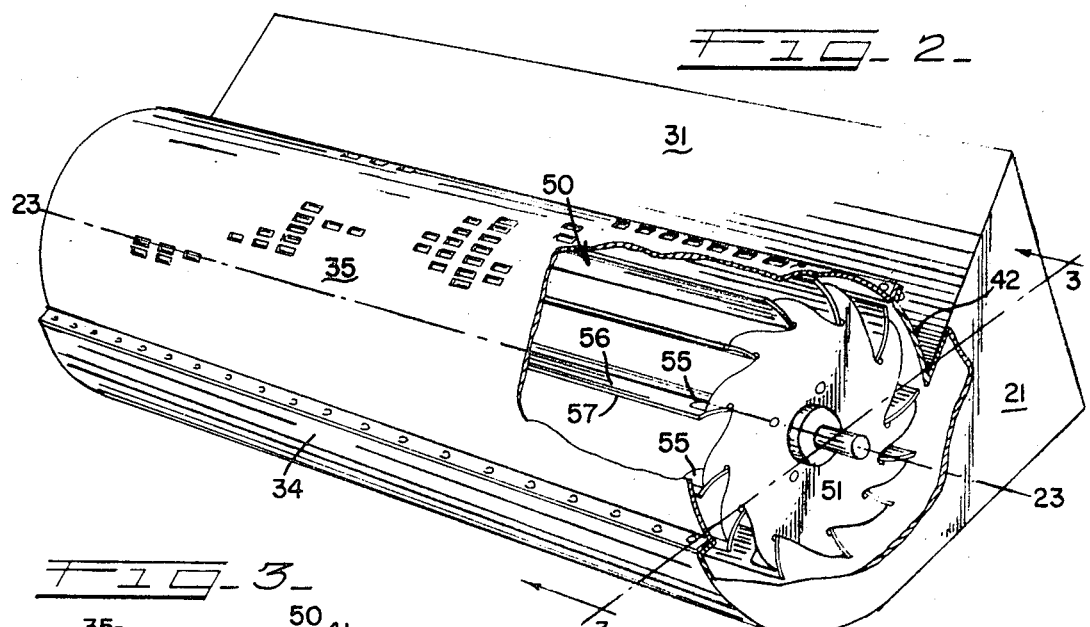
FIGURE 2 is a perspective view of the cleaning system fan isolated or removed from the combine.
Figure 3:
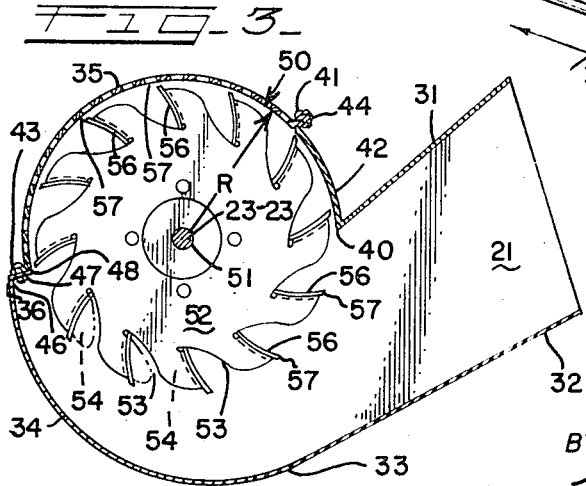
FIGURE 3 is a cross sectional view taken through lines 3—3 of FIGURE 2.

Referring now to FIGURES 2 and 3 wherein the enclosed fan casing 20 is shown isolated or removed from the combine 10, the enclosed casing 20 includes transverse sections that extend from one end section 21 to the other to thus form the enclosed casing. One of the transverse sections is the upper flat nozzle section 31 made of a material such as sheet metal that is impervious to the passage of air. The upper nozzle section 31 is arranged at an acut angle to the horizontal when it is mounted on the combine. Another of the transverse sections is the lower genrally flat nozzle section 32. Section 32 is likewise made of the material such as sheet metal that is impervious to the passage of air. Lower section 32 is also arranged at an acute angle to the horizontal when the fan is mounted on the combine. FIGURE 3 shows the enclosed casing 20 in its attitude to the horizontal when mounted on the combine 10. The lower portion of nozzle section 32 terminates along a bottom transverse zone 33 where it merges into the involute section 34. The involute section 34 originates along a medial zone 36 located substantially in the horizontal plane of the transverse axis 23—23. The involute section 34 is bent along a line 46 to form a flange 47 extending radially towards the axis 23—23. Flange 47 terminates along an edge 48 that is parallel to axis 23—23. As can be seen in FIGURE 3 the distance between axis 23—23 and involute section 34 increases from medial zone 36 to bottom zone 33. It should be understood that although the lower section 32 and the involute section 34 have been described as separate sections, this description is for the purpose of clarity and that these sections could be fabricated from a single sheet of material.

The fan casing 20 also includes an upper air impervious transverse section 42 and an upper air pervious transverse section 35. Both the impervious section 42 and the pervious section 35 have arcuate cross sections of a given radius R generated about axis 23—23. The impervious section 42 is joined to the upper discharge section 31 about their intersection 40. The impervious section has has outwardly extending flange designated 44. The pervious section 35 has a flange 41 that abuts flange 44 and a flange 43 that abuts flange 47. The abutting flanges 43, 47 and 41, 44 are removably secured to each other to permit removal of the air pervious section 35.

A drum shaped rotary fan or blower wheel 50 is supported by bearings 22 for rotation within the enclosed casing 20. The blower wheel 50 includes a shaft 51 and a plurality of radially extending disks 52 secured thereto. The blower wheel 50 extends the entire width of the enclosed casing 20 and there is a disk 52 at each end. The disk 52 can be fabricated from circular plates having grooves 53 cut therethrough. The grooves 53 are shaped such that tabs 54 are formed. The tabs 54 are then bent over to form mounts 55. For the purpose of illustration, in FIGURE 3, two of the tabs 54 have been shown in broken lines as they would appear before bending the tabs over to form the mounts 55. The blower wheel 50 is illustrated to have twelve mounts 55 equally spaced around its peripheral edge. However, it should be understood that this is for illustrative purposes only and it is contemplated that the blower wheel could have more or fewer mounts. The disk 52 making up the drum shaped fan are aligned such that elongated blades 56 can be connected to the mounts 55 with their leading edges 57 generally parallel to shaft 51. The elongated blades 56 are relatively narrow in the radial direction and thus the blower wheel 50 is substantially hollow.

The blower wheel 50 revolves in a counterclockwise direction as seen in FIGURES 2 and 3 and in so doing draws air through the air pervious section 35 into the interior of the enclosed casing 20 and causes it to be discharged between the discharge sections 31 and 32 and the end sections 21. It is applicants' opinion that the air entering through the pervious section 35 follows two main paths through the casing 20. The first or lower path is the air reacting to centrifugal force developed by the rotating blower wheel, and follows the involute section 34. A second path is formed by air flowing past blades 56 into the hollow center of blower wheel 50 and then past blades 56 at the other side of the blower wheel. An air vortex rotating in the same direction as the blower wheel is created within the hollow center of the wheel. Air following the second path enters the casing through the pervious section 35, and flows into the hollow center of blower wheel 50 where it encounters the vortex. The air is then accelerated by the vortex and discharged past blades 56. The air stream discharged from the vortex supplements the lower air stream flowing along the involute section 34 and discharge section 32 to thus form a composite air stream bounded by the end sections 21, upper discharge section 31 and lower discharge section 32.

In mounting applicants' fan on a combine, air is drawn into the fan casing across its entire width and is discharged in a uniform stream of substantial width and depth. Applicants have thus provided a fan for the cleaning system of a combine that can supply a uniform air stream without reducing the ground clearance or the overall height of the machine.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A combine: including a transverse fan for producing a wide air stream for use in a combine cleaning system; said fan including an enclosed casing;
   said casing having end sections spaced from each other, horizontally aligned bearings respectively mounted in contiguity with said end sections and establishing a transverse fan axis, said enclosed casing also having transverse sections extending from one end section to the other;
   said transverse sections including an upper air impervious nozzle section arranged at an acute angle to the horizontal such that it diverges from the horizontal in a direction away from said bearings, an upper air pervious section having an arcuate cross section of a given radius formed about said transverse fan axis, a lower air impervious nozzle section underlying said upper nozzle section and arranged in an acute angle to the horizontal, said lower nozzle section originating along a bottom transverse zone below said transverse fan axis, an involute section originating along a medial zone substantially in the horizontal plane of said transverse fan axis, said involute section being formed from material that is impervious to air and terminating along said bottom transverse zone such that it merges smoothly with said lower nozzle section;
   a drum shaped blower wheel having a radius slightly smaller than said given radius and extending from one end section to the other;
   said blower wheel mounted for rotation in said bearings within said enclosed casing and adapted to draw air into said enclosed casing through said upper air pervious section and discharge the air in a uniform stream through the nozzle formed by said end sections and said upper and lower nozzle sections.

2. The invention as set forth in claim 1 wherein said transverse sections further include an upper impervious section having an arcuate cross section of said given radius, said upper air impervious section being connected along one transverse edge to said upper air pervious section and connected along its other transverse edge to said upper nozzle section.

3. The invention as set forth in claim 1 wherein a generally radial flange connects a transverse edge of said upper air pervious section and said involute section in said medial zone, said radial flange being impervious to air.

4. The invention as set forth in claim 2 wherein a generally radial flange connects a transverse edge of said upper air pervious section and said involute section in said medial zone, said radial flange being impervious to air.

5. The invention as set forth in claim 1 wherein said drum shaped blower wheel includes a plurality of elongated blades extending axially in a cylindrical pattern forming a hollow blower wheel.

6. The invention as set forth in claim 2 wherein said drum shaped blower wheel includes a plurality of elongated blades extending axially in a cylindrical pattern forming a hollow blower wheel.

7. The invention as set forth in claim 3 wherein said drum shaped blower wheel includes a plurality of elongated blades extending axially in a cylindrical pattern forming a hollow blower wheel.

References Cited

UNITED STATES PATENTS

| | | | |
|---|---|---|---|
| 939,449 | 11/1909 | Silver | 130—27.14 |
| 1,109,393 | 9/1914 | Blackstead | 230—133 |
| 2,849,118 | 8/1958 | Ashton. | |
| 3,306,526 | 2/1967 | Laing | 230—125 |

FOREIGN PATENTS

| | | |
|---|---|---|
| 978,464 | 12/1964 | Great Britain. |

HENRY F. RADUAZO, Primary Examiner

U.S. Cl. X.R.

130—27; 230—133